United States Patent
Canora et al.

(10) Patent No.: US 8,201,073 B2
(45) Date of Patent: Jun. 12, 2012

(54) SYSTEM AND METHOD FOR AUTOMATING THE CREATION OF CUSTOMIZED MULTIMEDIA CONTENT

(75) Inventors: David J. Canora, Winter Garden, FL (US); Michael A. Colglazier, Orlando, FL (US); Eric James Goodman, Orlando, FL (US); Ronald L. Weaver, Jr., Kissimmee, FL (US); Robert Alan Swirsky, Sunnyvale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 998 days.

(21) Appl. No.: 11/204,908

(22) Filed: Aug. 15, 2005

(65) Prior Publication Data

US 2007/0038938 A1    Feb. 15, 2007

(51) Int. Cl.
*G06F 17/00* (2006.01)
*G06F 3/00* (2006.01)

(52) U.S. Cl. ........ 715/201; 715/202; 715/203; 715/204; 715/205; 715/722; 715/723; 715/724; 715/725; 715/726

(58) Field of Classification Search .......... 715/201–205, 715/722–726
See application file for complete search history.

(56) References Cited

U.S. PATENT DOCUMENTS

| | | | |
|---|---|---|---|
| 5,576,838 A * | 11/1996 | Renie | 386/117 |
| 5,655,053 A | 8/1997 | Renie | |
| 6,032,156 A * | 2/2000 | Marcus | 715/201 |
| 6,453,459 B1 | 9/2002 | Brodersen et al. | |
| 6,490,409 B1 | 12/2002 | Walker | |
| 6,526,158 B1 * | 2/2003 | Goldberg | 382/115 |
| 6,591,068 B1 * | 7/2003 | Dietz | 396/429 |
| 6,819,783 B2 * | 11/2004 | Goldberg et al. | 382/115 |
| 7,024,424 B1 * | 4/2006 | Platt et al. | 1/1 |
| 7,362,919 B2 * | 4/2008 | Das et al. | 382/284 |
| 7,561,723 B2 * | 7/2009 | Goldberg et al. | 382/115 |
| 7,607,843 B2 * | 10/2009 | Gluck | 396/427 |
| 7,788,592 B2 * | 8/2010 | Williams et al. | 715/764 |
| 2002/0030745 A1 | 3/2002 | Squilla et al. | |
| 2002/0118948 A1 | 8/2002 | Jones | |

(Continued)

FOREIGN PATENT DOCUMENTS

WO    99/01830    1/1999

(Continued)

OTHER PUBLICATIONS

'Muvee autoproducer DVD Edition Awarded 4 Stars by PC Magazine, Fast, Fun and easy video editing software lets anyone automatically create their own MTV-style videos in a snap', news release, Muvee Technologies, Singapore, Apr. 30, 2003.*

(Continued)

*Primary Examiner* — Chau Nguyen
(74) *Attorney, Agent, or Firm* — Ference & Associates LLC

(57) ABSTRACT

A method and system for enabling the creation of custom-choreographed multimedia content by combining content selected by a user with additional predefined content not selected by the user using an intelligent scripting and video rendering engine. The system and method reduce the user's involvement in preparing the multimedia content to simply selecting specific content the user wants to include in the final multimedia product and leaves the choreography and creation of the final product to the system and method, which intelligently script the final multimedia product based on the particular content selected by a user and/or any characteristics associated with the selected content.

47 Claims, 9 Drawing Sheets

U.S. PATENT DOCUMENTS

| | | | |
|---|---|---|---|
| 2002/0144293 | A1 | 10/2002 | Dimitrova et al. |
| 2002/0180803 | A1 | 12/2002 | Kaplan et al. |
| 2002/0186301 | A1 | 12/2002 | Hasegawa |
| 2003/0007784 | A1 | 1/2003 | Loui et al. |
| 2003/0025726 | A1 | 2/2003 | Yamamoto |
| 2003/0033296 | A1* | 2/2003 | Rothmuller et al. ............... 707/3 |
| 2003/0059199 | A1 | 3/2003 | Hossain |
| 2003/0182143 | A1 | 9/2003 | Conrad et al. |
| 2003/0198463 | A1 | 10/2003 | Temple et al. |
| 2003/0206729 | A1 | 11/2003 | Loui et al. |
| 2004/0017390 | A1 | 1/2004 | Knowlton et al. |
| 2004/0024898 | A1 | 2/2004 | Wan |
| 2004/0027369 | A1* | 2/2004 | Kellock et al. ................. 345/716 |
| 2004/0117257 | A1 | 6/2004 | Haberman et al. |
| 2004/0122539 | A1 | 6/2004 | Ainsworth |
| 2004/0153970 | A1 | 8/2004 | Shinoda et al. |
| 2004/0190874 | A1 | 9/2004 | Lei et al. |
| 2004/0221308 | A1 | 11/2004 | Cuttner et al. |
| 2005/0123886 | A1 | 6/2005 | Hua et al. |
| 2005/0165795 | A1* | 7/2005 | Myka et al. ................... 707/100 |
| 2005/0217462 | A1* | 10/2005 | Thomson et al. ............... 84/612 |
| 2005/0231511 | A1* | 10/2005 | Doepke et al. ................. 345/473 |
| 2005/0268279 | A1* | 12/2005 | Paulsen et al. ................. 717/110 |
| 2008/0101762 | A1* | 5/2008 | Kellock et al. .................. 386/52 |
| 2011/0314377 | A1* | 12/2011 | Goodman et al. ............ 715/716 |

FOREIGN PATENT DOCUMENTS

| | | |
|---|---|---|
| WO | 01/13277 | 2/2001 |

OTHER PUBLICATIONS

'Muvee Technologies launches muvee autoProducer-the world's only smart automatic video editing software', news release, Muvee Technologies, Oct. 29, 2001.*

Karim Nice, How DVDs Work, Jun. 29, 2005, 16 pages, http://electronics.howstuffworks.com/dvd.htm/printable.

DVD Format Definition, Jul. 1, 2005, 4 pages, http://stream.uen.org/medsol/dvd/pages/dvd_format_filestructure.html.

DVD-Video Data & File Structure, Jul. 1, 2005, 3 pages, Deluxe Global Media Services, Ltd., http://www.disctronics.co.uk/technology/dvdvideo/dvdvid_struct.htm.

The DVD (Video) file structure, Jul. 1, 2005, 2 pages, DVDXCOPY. afterdawn.com, http://dvdxcopy.afterdawn.com/thread_view.cfm/192714.

International Search Report for WO2007/021277A1, Feb. 6, 2006 (1 page).

Supplementary European Search Report for Application No. EP 05 78 4851, Nov. 9, 2010 (6 pages).

* cited by examiner

```
<GDDL JOBID="SWIRSKY001">
<MENU TITLE="Robert and Steven%27s Disney Vacation">
  <SELECTION TITLE="The Magic Kingdom" CHAPTER="CH001" />
  <SELECTION TITLE="Disney%27s Animl Kingdom" CHAPTER="CH002" />
  <SELECTION TITLE="Epcot" CHAPTER="CH003" />
</MENU>
<CHAPTER ID="CH001">
    <SEGMENT TRANSITION="CROSSFADE" VIDEO="MKMAINSTREET">
          <IMAGE ID="0EF123A32" FRAME="MK001" TRANSITION="LEFTSLIDE"    TIME="00:00.00"   DURATION="5" />
          <IMAGE ID="1EF123A32" FRAME="MK001" TRANSITION="LEFTSLIDE"    TIME="00:10.00"   DURATION="5" />
          <IMAGE ID="0EF123A33" FRAME="MK002" TRANSITION="LEFTSLIDE"    TIME="00:20.00"   DURATION="5" />
          <IMAGE ID="2EF123A34" FRAME="MK002" TRANSITION="LEFTSLIDE" TIME="00:30.00"   DURATION="5" />
          <IMAGE ID="3EF123A32" FRAME="MK002" TRANSITION="LEFTSLIDE"    TIME="00:40.00"   DURATION="5" />
    </SEGMENT>
    <SEGMENT TRANSITION="CROSSFADE" VIDEO="MKTOMORROW">
          <IMAGE ID="21F123A32" FRAME="MK021" TRANSITION="ULSWELL" TIME="00:45.00"   DURATION="5" />
          <IMAGE ID="22F123A32" FRAME="MK021" TRANSITION="ULSWELL" TIME="00:50.00"   DURATION="5" />
          <IMAGE ID="23F123A33" FRAME="MK022" TRANSITION="ULSWELL" TIME="00:55.00"   DURATION="5" />
    </SEGMENT>
  </CHAPTER>
  <CHAPTER ID="CH002">
    <SEGMENT TRANSITION="CROSSFADE" VIDEO="MKMAINSTREET">
          <IMAGE ID="32F123A32" FRAME="MK001" TRANSITION="CENTERSWELL"    TIME="00:00.00"   DURATION="5" >
                  <CAPTION TEXT="Buzz Lightyear!" FONT="Lithos" POSX="30" POSY="550" />
          </IMAGE>
          <IMAGE ID="2EF123A32" FRAME="MK001" TRANSITION="FADE" TIME="00:10.00"   DURATION="5" />
          <IMAGE ID="4EF123A33" FRAME="MK00" TRANSITION="CENTERSWELL" TIME="00:20.00"   DURATION="5" >
                  <CLIP ID="MKMAINMICKEY" POSX="100" POSY="200" TIME="00:30.00"   DURATION="5" />
          </IMAGE>
    </SEGMENT>
  </CHAPTER>
  <CHAPTER ID="CH003">
    <SEGMENT TRANSITION="CROSSFADE" VIDEO="EPWORLDSHOW">
          <IMAGE ID="52F123A32" FRAME="EP001" TRANSITION="FADE" TIME="00:10.00"   DURATION="5" />
          <IMAGE ID="9EF123A32" FRAME="EP100" TRANSITION="FADE" TIME="00:20.00"   DURATION="5" />
          <IMAGE ID="123723A33" FRAME="EP101" TRANSITION="WIPE" TIME="00:30.00"   DURATION="5" />
    </SEGMENT>
  </CHAPTER>
  <CHAPTER ID="CH004">
     <GALLERY>
          <IMAGE ID="21F123A32" TIME="00:10.00"   DURATION="5" >
          <IMAGE ID="23F123A33" TIME="00:20.00"   DURATION="5" >
          <IMAGE ID="0EF123A33" TIME="00:30.00"   DURATION="5" >
    <GALLERY>
  </CHAPTER>
</GDDL>
```

FIG. 5

SYSTEM AND METHOD FOR AUTOMATING THE CREATION OF CUSTOMIZED MULTIMEDIA CONTENT

BACKGROUND

1. Field

A system and method are disclosed which generally relate to generation of multimedia content, and more particularly to a system and method of automatically generating customized multimedia content.

2. General Background

As the use of digital cameras has increased in recent years, traditional photo albums have been replaced with electronic photo albums for storing digital images. In order to share these electronic photo albums with others, the electronic photo albums can be copied onto portable digital media, such as a CD, or forwarded via email in an attached electronic file. Still further, it is known to copy electronic photo albums onto multimedia enabled digital media, such as a DVD, capable of being viewed using popular, commercially available consumer equipment (e.g., DVD players).

When utilizing a multimedia enabled disc, it is possible to add other types of media (videos, audio, etc.) to the images stored on the DVD to create a multimedia DVD that can be played on either a DVD player or a personal computer. Currently, there exist commercial software products that allow users to create customized multimedia files based on their own multimedia content by combining different types of media formats. These software products, for example, allow users to take their digital pictures and/or personal videos and use the templates and the content included with the software to create a DVD to share with family and friends. This process of creating multimedia DVDs is time-consuming, sometimes complex and requires a level of artistic creativity not possessed by typical computer users.

SUMMARY

The following is a summary of various aspects realizable according to various embodiments of the system and method of automatically generating customized multimedia content according to the present disclosure. It is provided as an introduction to assist those skilled in the art to more rapidly assimilate the details of the disclosure and does not and is not intended in any way to limit the scope of the claims that are appended hereto.

In one aspect, a method of automating the creation of customized multimedia content is disclosed along with a system for performing the same. The method and system enable the creation of custom-choreographed multimedia content by combining content selected by a user with additional predefined content not selected by the user using an intelligent scripting and video rendering engine. The system and method reduce the user's involvement in preparing the multimedia content to simply selecting specific content the user wants to include in the final multimedia product and leaves the choreography and creation of the final product to the system and method, which intelligently script the final multimedia product based on the particular content selected by a user and/or any characteristics associated with the selected content.

BRIEF DESCRIPTION OF THE DRAWINGS

By way of example, reference will now be made to the accompanying drawings.

FIG. 5 illustrates an exemplary DVD Description Language script generated in accordance to one embodiment.

DETAILED DESCRIPTION

A system and method of automating the creation of customized multimedia content is disclosed herein. In one embodiment, the term "multimedia" generally refers to the inclusion of several types of content media, such as but not limited to images, audio, video, text, graphics, animation, voice, taken alone and in any combination thereof.

In one embodiment, a method and system are disclosed for enabling the creation of custom-choreographed multimedia content by a user based on combining and seamlessly blending content selected by a user with predefined content not selected by the user using an intelligent scripting and video rendering engine. The system and method reduce the user's involvement in preparing final customized multimedia product to simply selecting specific content the user wants to include in the final multimedia product and leaves the choreography and creation of the final product to the system and method, which intelligently script the final multimedia product based on the particular content selected by a user and any characteristics associated with the selected content.

The system and method of creating customized multimedia content utilizes the concept of "mass-customization." Mass-customization refers to a process whereby a product is built-to-order with custom specifications while retaining the efficiencies associated with mass production. The present system and method allow mass-customized multimedia content to be produced using the employment of intelligent scripting and intelligent rendering.

Figure 1:
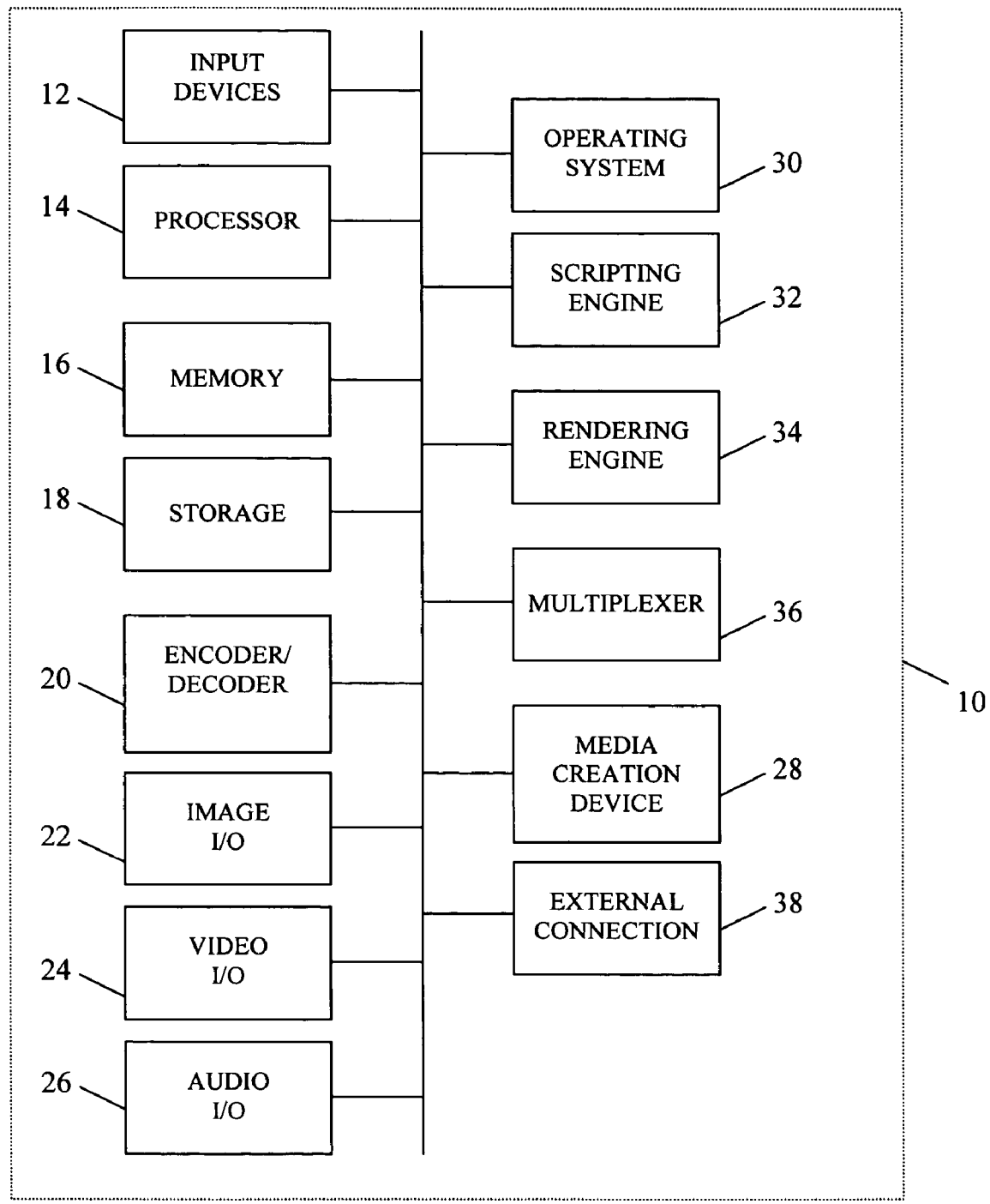
FIG. 1 illustrates a system for automatically creating customized multimedia content.

FIG. 1 illustrates a system for automatically creating customized multimedia content. A customizable multimedia content creation system 10 includes electrically connected hardware elements including input devices 12, a processor 14, a memory 16, a storage 18, an encoder/decoder 20, an image I/O device 22, a video I/O device 24, an audio I/O device 26, a media creation device 28 and a connection to an external source 30. The multimedia content creation system 10 further comprises software elements including an operating system 32, an intelligent scripting engine 34, an intelligent rendering engine 36 and multiplexer 38.

Several variations of the customizable multimedia content creation system 10 elements are contemplated and within the intended scope of the present disclosure. For example, given processor and computer performance variations and ongoing technological advancements, hardware elements, such as encoder/decoder 20, may be embodied in software or in a combination of hardware and software. Similarly, software elements, such as multiplexer 38, may be embodied in hardware or in a combination of hardware and software.

In one embodiment, the customizable multimedia content creation system 10 is connected to other devices, the internet or networks (including but not limited to local area networks, wide area networks and the internet) through the external connection 30. The external connection 30 may be wired, wireless and/or another type of connection to other computing devices or networks. The network connection 30 further allows various components of the customizable multimedia content creation system 10 to reside in locations which are remote from each other and are connected through a wired, wireless or other type of connection. For example, most of the components of the customizable multimedia content creation system 10 may be located on a server, while the input devices 12 may be remotely located from the server and may comprise a GUI or a personal computer having an internet-delivered user interface. This would enable a user to access a website through the internet from the user's home or other location to provide the user-selected content to include in the customizable multimedia content.

In another embodiment, the system 10 can be a stand-alone device located within a user's home, such a self-contained unit or can be contained entirely in software and hardware residing within a personal computer, or can be located outside the user's home, such as residing in a multimedia kiosk, retail store, photo studio or other business venue.

Input devices 12 can comprise any number of devices and/or device types for communicating with the user and allowing the user to input commands and/or data, including but not limited to a display, keyboard, mouse, track ball, touch screen interface, speech recognition device or other input device. In one embodiment, the customizable multimedia content creation system 10 includes input/output devices for providing or acquiring multimedia content, such as image I/O 22, video I/O 24, audio I/O 26 or I/O devices for other types of content. Such I/O devices may include an input port, CD drive, a DVD-ROM drive, a flash card or memory card reader, a floppy disk drive, a microphone, a wireless port, a fixed or portable database and the like.

In one embodiment, a media creation device 28 is provided for producing a media product containing the customizable multimedia content, where the media creation device 28 may comprise a CD/DVD writer for the creation of a multimedia enabled disc, a USB port or other type of port or device for storing the customizable multimedia content as an electronic file on a media. Various types of multimedia enabled discs may be created by media creation device 28, for example, a VCD (video compact disc), a SVCD (super video compact disc), a DVD (digital video disc) or other video formats known to those skilled in the art, to be played on a personal computer or on consumer audiovisual equipment. Further, most personal computers and consumer audiovisual equipment include input ports that allow electronic files on portable storage mediums to be played, such that the customizable multimedia content that automatically created can be stored as an electronic file on a portable storage medium that is inserted into an input port.

The image I/O 22 can be configured to access images from various sources, including digital images taken with a digital camera, images recorded on photographic film and then scanned and converted to digital format, digital images stored on a storage device or portable memory device, or images stored in an image database. In one embodiment, the image database may include theme-specific images, for example images from an amusement park, cruise, tourist attraction, special event, etc. The images can still further include graphics and animations. Images may alternatively be acquired from other sources available by means of the external connection 30 or other connections. Examples of image formats for images supplied by image I/O 22 can include, but are not limited to, BMP, DCS, DIB, EXIF, FlashPix, IMPS, JPEG, JPEG 2000, PhotoCD, PPM, TIFF, and Raw image formats.

The video I/O 24 can similarly be configured to provide video from various sources, such as through an input port for connecting to a camera for downloading video taken by a user or for connecting portable memory thereto. Video can also be provided by accessing video stored in a video database comprising prerecorded video or containing a plurality of video clips. In one embodiment, the video can be theme-specific, for example scenes from an amusement park, cruise, tourist attraction, special events, etc. The video I/O 24 also allows a user to provide personally composed video compositions. Video may alternatively be supplied from other sources available by means of the external connection 30 or other connections. Examples of video formats for video supplied by video I/O 24 can include, but are not limited to, Windows Media Video (WMV), MPEG-1, MPEG-2, MPEG-4, H.261, H.262, H.263, CCIR 601 (digital video standard), AVI (MS Windows media format), Quicktime, DV (from digital video camcorders), and real video (Real Network).

The audio I/O 26 can similarly be configured to provide audio from various sources, such as through an input port for connecting to a microphone, a recording device for downloading audio or music information recorded by a user, or a portable memory device. Audio information can also be provided by accessing audio information stored in an audio database comprising prerecorded audio clips or music. In one embodiment, the audio information may be theme-specific, for example music or audio associated with characters, people, movies, events, amusement parks, tourist attractions, etc. The audio I/O may further allow a user to provide personally composed audio or musical compositions. Audio information may alternatively be supplied from other sources available by means of the external connection 30 or other connections. The audio I/O 26 can allow a user to annotate their images or video with an associated speech file (e.g., a .wav file). Examples of audio formats for audio information supplied by audio I/O 26 can include, but are not limited to, Windows Media Audio (WMA), Wave file, MP3, Music CD audio, Apple/SGI formats (.AIFF, .AIF), Sun audio (.AU), and Creative Lab format (.VOC).

Figure 2:
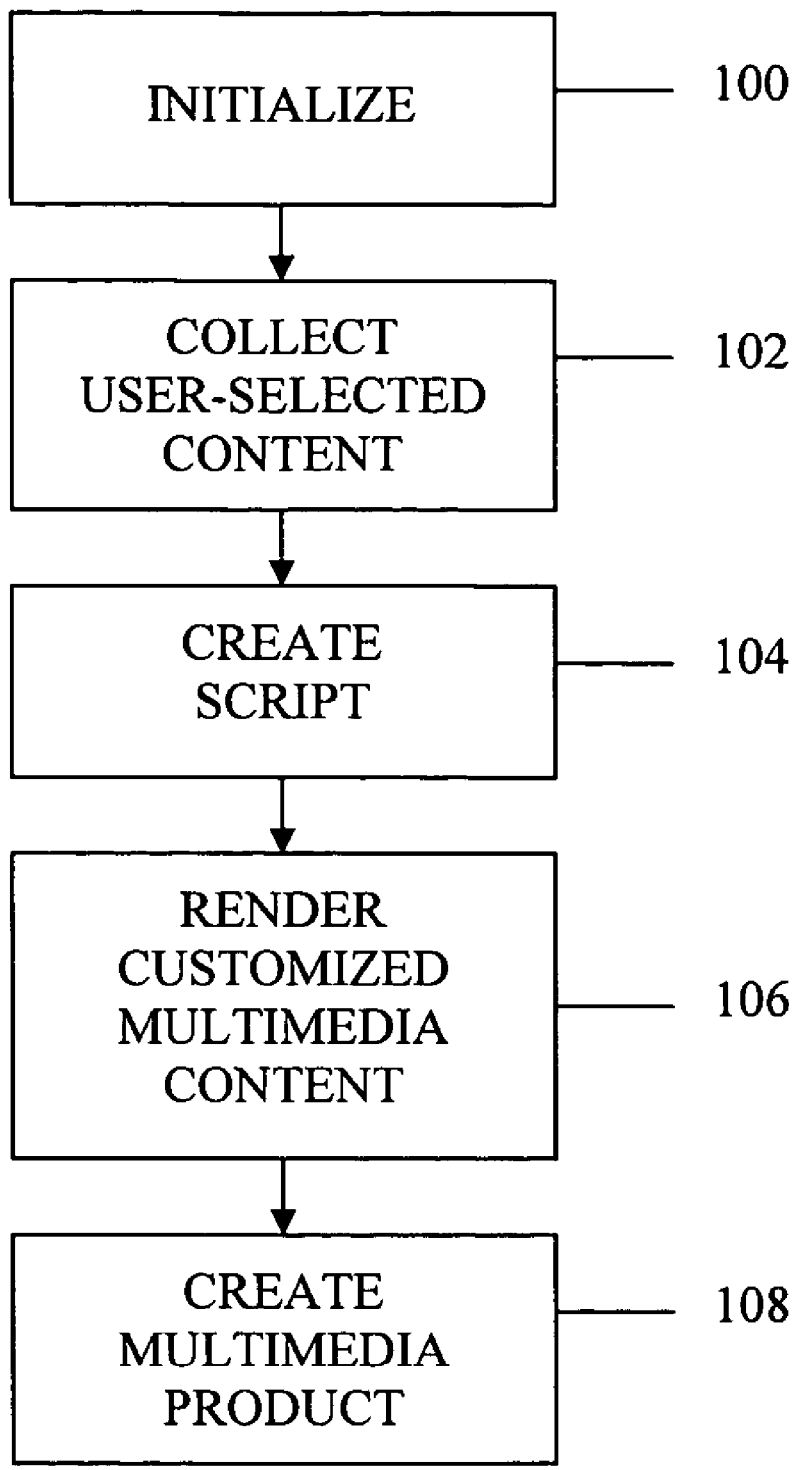
FIG. 2 illustrates a flow diagram for automatically creating customized multimedia content.

FIG. 2 illustrates a flow diagram for automatically creating customized multimedia content. At process block 100, the customized multimedia content software application is initialized. In process block 102, media content selected by the user to be included in the customized multimedia content is collected. In process block 104, an intelligent script for the customized multimedia content is automatically generated based on the user-selected content. Intelligent scripting refers to a method whereby instructions for creating the customized multimedia content are generated using a set of rules that are affected by content selected by the user. The intelligent scripting generates instructions for combining the user-selected content with additional predefined content based the set of rules. A multimedia file containing the customized multimedia content is then rendered in process block 106 using the script that was created. Finally, the multimedia file may be recorded onto a multimedia product in process block 108 using the media creation device 28.

Figure 3A:
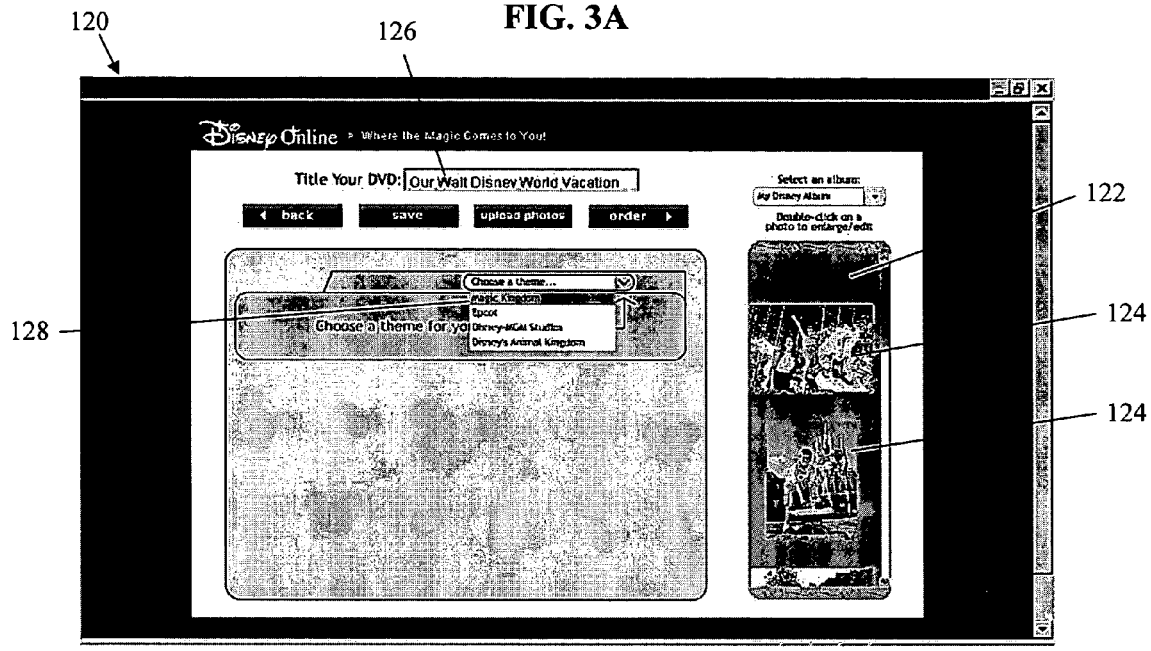
FIGS. 3A-3C illustrate exemplary screens in which content is selected by a user in accordance with the process of FIG. 2.
Figure 3B:
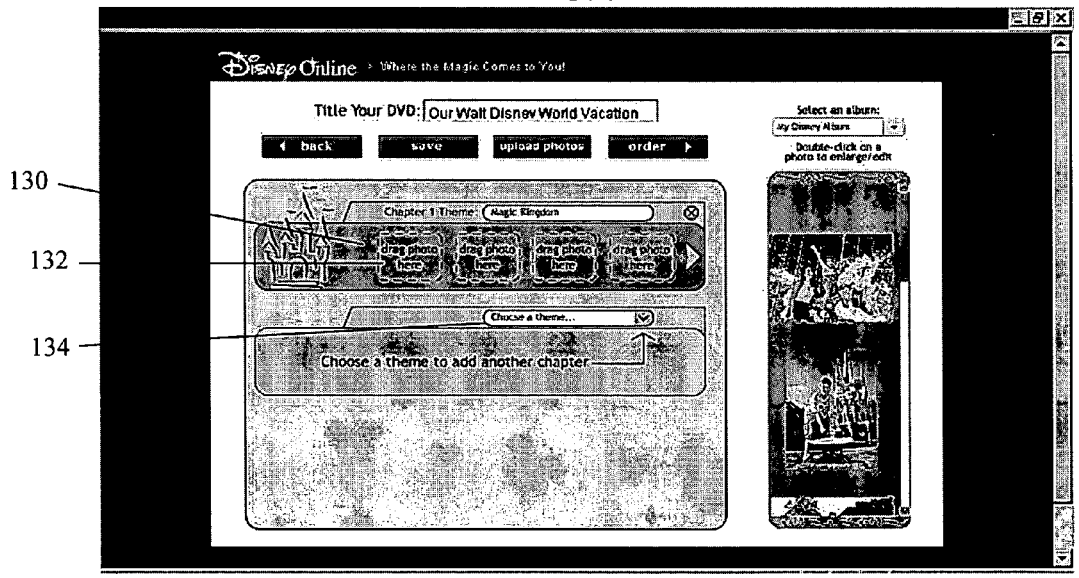
Figure 3C:
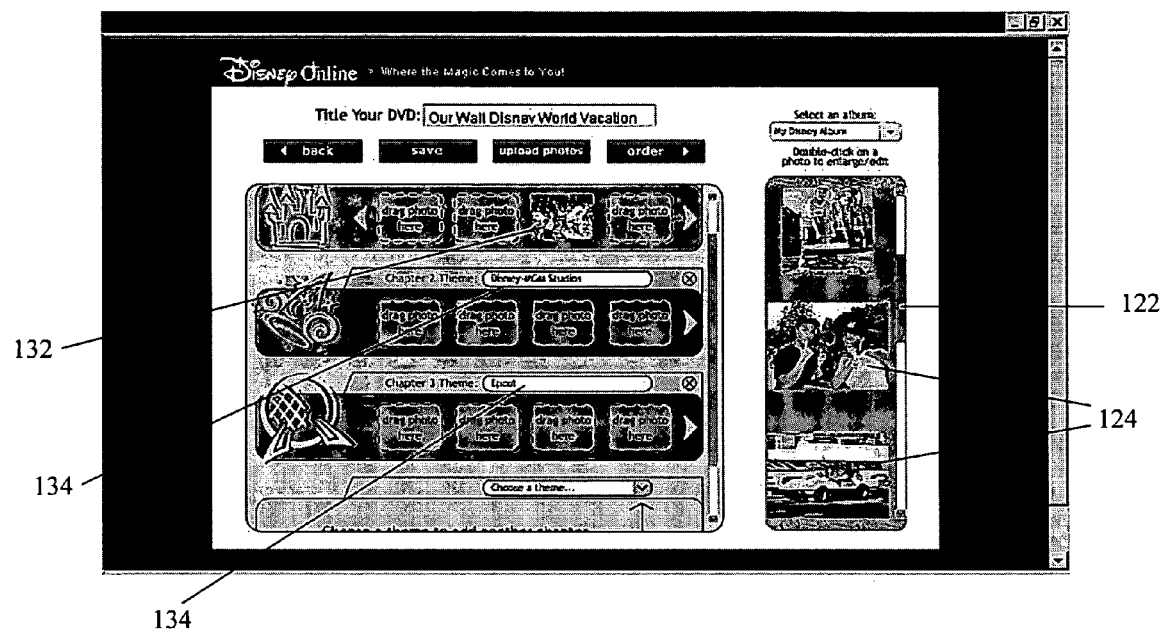

FIGS. 3A-3C illustrate exemplary screens in which content is selected by a user in accordance with the process of FIG. 2. The process block 102 of collecting user-selected content is further described in accordance with a preferred method of interfacing with a user using a graphical user interface (GUI). However, other types of interfaces may be utilized and the present disclosure is not intended to be limited to GUIs. After the customized multimedia content creation system is initialized, a GUI 120 is presented to the user on a screen. The GUI includes icons/characters/graphics representative of the features of the customized multimedia content creation application and a content display area 122. In the present example, the content being displayed in content display area 122 are images 124, while it is understood that audio, video, graphics, text, animation or other types of content. A title annotation area 126 is provided which enables users to provide a title for the customized multimedia content being generating using one of the input devices 12. In order to organize the user-selected content into folders, a drop down menu 128 with predetermined themes or folder names may be provided in the GUI 120. The drop down menu 128 may alternatively be modifiable by the user to provide new themes for folder names as input by the user. Once a folder title is selected from the drop down menu 126, a folder content area 130 is opened and the user is prompted to select content from the content display area 122 to include in the selected folder. In the example illustrated in FIG. 3B, the user selected the theme "Magic Kingdom" to describe a chapter of the user's multimedia content entitled "Our Walt Disney World Vacation." The user would then select images 124 from the content display area 122 which correspond to the selected theme and click and drag or otherwise place the images into placeholders 132 in the folder content area 130. An additional drop down menu 134 would then appear to provide the user with the option to organize images according to another theme or folder. As illustrated in FIG. 3C, the user can select a plurality of different themes for folders, such as "Disney-MGM Studios" or "Epcot," where the user would then select the appropriate images 124 from the content display area 122 to include in the respective folders 134. As described above, the images can be accessed from various sources, including image I/O 22 or storage database 18.

In one embodiment, it is also possible for multiple content display areas 122 to be provided with different types of content media contained in each content display area 122 for the user to select to be included in the customized multimedia content. For example, respective content display areas 122 could contain images, video, audio, graphics, etc. In yet another embodiment, the user may not be required to select a title or folder, where all of the user-selected content would be placed within a single default folder.

In the example illustrated in FIGS. 3A-3C, a user who has visited a Walt Disney World resort is able to create a video DVD keepsake that seamlessly combines vacation photographs with predefined amusement park-related multimedia. The user is asked, via the GUI 120, to select photos for their movie, organize them into logical "chapters" (e.g., Magic Kingdom photos) and submit them for their video to be prepared. The customized multimedia content creation system 10 would then, via an automated process, script the movie based on the user's selections, render the video files by combining the photos with predefined multimedia content as directed by the script, and burn the result to a DVD along with a themed DVD menu structure and other content such as a full-screen slideshow of the user's photos. The customized multimedia content may include music, sound effects, still images, video backgrounds, chroma key effects, etc.

In one embodiment, the predefined content can be associated with metadata about the predefined content. A first set of metadata can provide information about the substance, quality, condition, and other characteristics of the predefined content or a portion of the predefined content. For example, metadata related to the predefined content can include one or more of the name, color, category, display time, type of media, etc., of the predefined content. For example, metadata for a frame to be displayed around a picture can include the size of the frame as well as a "Magic Kingdom" title. In one approach, the metadata related to the predefined content can be created at the same time the predefined content is created.

In another embodiment, the user-selected content may also contain or provide metadata about the user-selected content. A second set of metadata can provide information about the substance, quality, condition, and other characteristics of the user-selected content. Metadata may be associated with the user-selected content based upon the particular selections made by the user. For example, when a user selects an image from the content display area 122 to be placed within the "Magic Kingdom" chapter or folder, as shown in FIG. 3C, an association would be made in metadata between the selected image and the "Magic Kingdom." The metadata associated with the user-selected content can then later be used to match predefined content with the user-selected content.

In one embodiment, the user-selected content is associated with the predefined content based upon a set of rules. The association of the user-selected content with the predefined content is established by comparing the metadata for the user-selected content and the predefined content. The set of rules can be applied to make the comparison between the first set of metadata for the predefined content and the second set of metadata for the user-defined content. At least a portion of the predefined media content can be selected if a threshold for similarity is surpassed as a result of comparing the first set of metadata with the second set of metadata according to a set of rules.

For example, if the user selects a theme of "Magic Kingdom," the metadata associated with the user-selected content is "Magic Kingdom." The set of rules can be applied to compare this metadata with corresponding metadata "Magic Kingdom" of predefined content. If there is a match, predefined multimedia content having metadata associated with the "Magic Kingdom" could then be combined with the selected image in the scripting process.

In one embodiment, the set of rules establishes a threshold that requires an exact match between the search string of the first metadata and the second metadata. For example, if the user enters a search string of "The Magic Kingdom" to search for predefined content, the set of rules are applied to search for "The Magic Kingdom" in the metadata of the predefined content. If the threshold of similarity requires that the match be exact, the search string "The Magic Kingdom" will only match if the metadata of the predefined content metadata includes that exact words "The Magic Kingdom." Therefore, predefined content metadata such as "The Magic Kingdom is fun" would match the search. However, predefined content metadata such as "My Magic Kingdom" would not match because the string "My Magic Kingdom" does not include the string "The Magic Kingdom."

In another embodiment, the set of rules establishes a threshold such that if one word of the first metadata is found on the second metadata, then a match is established. For example, a user can enter a search string "The Magic Kingdom is fun." Then, metadata of predefined content having the words "Magic," "Kingdom," or "fun" would be deemed to match. Predefined content metadata that includes "Animal Kingdom" would match because the string "Animal Kingdom" contains the word "Kingdom." Therefore, predefined content associated with metadata "Animal Kingdom" would match a search of "The Magic Kingdom is fun."

In yet another embodiment, the set of rules establishes a threshold such that if a set of designated words of the first metadata is found on the second metadata, then a match is established. For example, a user can enter a search string "The Magic Kingdom." Then, metadata of predefined content having the words "The Magic," or "Magic Kingdom," would match. Thus, predefined content metadata that includes "Magic Kingdom Adventure" would match because the string "Magic Kingdom Adventure" contains the designated words "Magic Kingdom." Therefore, predefined content associated with metadata "Magic Kingdom Adventure" would match a search of "The Magic Kingdom."

A threshold level as described above can be helpful for the configuration of a system that focuses on the keywords of a search eliminating unnecessary words such as pronouns. A search with this threshold level will result in predefined content of higher degree of relevancy and usefulness to the user.

In another embodiment, the set of rules can establish a threshold such that if one portion, section, or substring of the first metadata is found on the second metadata, then a match is established. For example, if a user enters a search string "The Magic Kingdom" then metadata of predefined content having the words "Magic" or "King" can also be deemed to match. For instance, predefined content metadata that includes "The Lion King" would match because the string "The Lion King" contains the substring "King." Therefore, predefined content associated with metadata "The Lion King" would match a search of "The Magic Kingdom." As a result, the predefined multimedia content having metadata associated with "King" can be automatically combined with the user-defined content in the scripting process.

Intelligent Scripting

Once the user selects the content to be included in the customized multimedia content, an automated process then scripts a multimedia video in process block 104 to intelligently combine the user-selected content with predefined content that is accessible via memory 16, storage 18, image I/O 22, video I/O 24, audio I/O 26 or external connection 38. In one embodiment, "predefined content" can be content that is previously prepared, recorded or made and is not selected or selectable by the user during the user-content selection process block 102. This process of intelligent scripting describes a method whereby the instructions for creating customized multimedia content are generated by a set of rules that are affected by content selected by the user. These rules are further related to the predefined content that is made available as input to the customized multimedia content creation device 10. Different sets of predefined content may have different rules sets, where rule sets may further be capable of operating on multiple sets of predefined content.

Figure 4A:
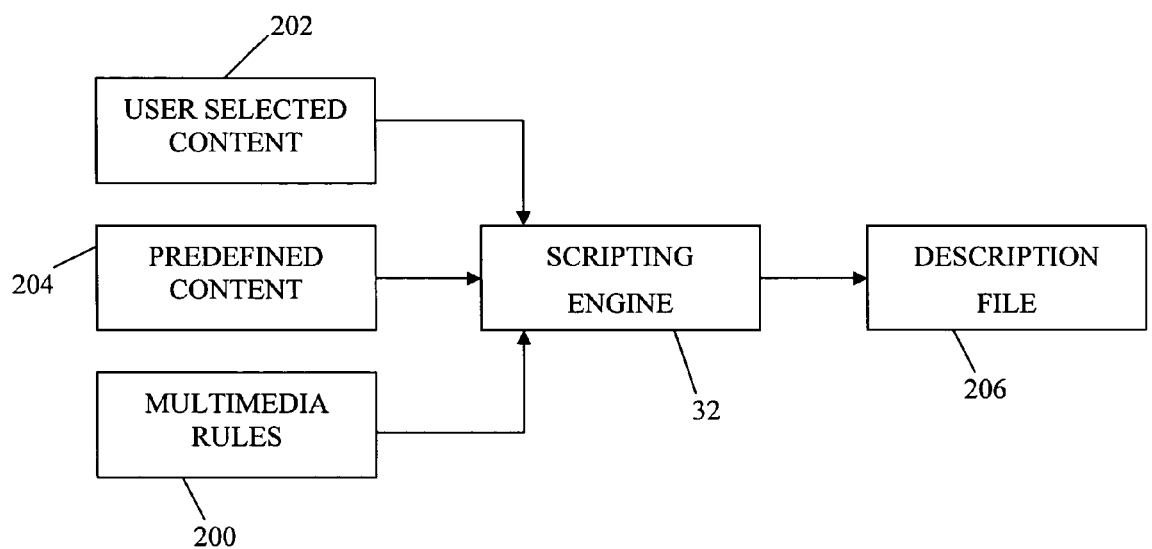
FIG. 4A illustrates a flow diagram for an embodiment in which a scripting engine generates a script for the customized multimedia content.

FIG. 4A illustrates a flow diagram for an embodiment in which a scripting engine generates a script for the customized multimedia content. The scripting engine 32 utilizes the multimedia rule sets 200 and user-selected content 202 as inputs to determine which predefined content 204 to include in the script. The scripting engine 32 generates the script in the form of a description file 206 that is used by the rendering engine 34 to generate the customized multimedia content video file. If the video file will be in DVD format, the description file 206 is an XML file or the like written in a DVD Description Language (DDL), where it is understood that the description file 206 can be written in another type of description language for other types of video formats.

The user-selected content 202 and the metadata associated with the user selected content affects how the multimedia rules 200 generate the instructions (or "script") in the description file 206 used by the rendering engine 34 to construct the final output.

In one embodiment, the scripting engine 32 can utilize the multimedia rules 200 to determine the predefined content 204 that is included in a given segment of the customized multimedia content either: 1) explicitly based on the particular content selected by the user (e.g., the user chooses to include a chapter having a specific theme or folder, such a "Magic Kingdom" chapter, and the predefined content would be selected to match such a specific theme), or 2) implicitly based on the content selected by the user (e.g., the number of images chosen by a user could define the length of the customized multimedia content scripted or could define the number of additional predefined images to combine with the selected images, such that a larger number of user-selected images may result in a longer segment and/or a different number of predefined stock images being included).

In another embodiment, the scripting engine 32 can also utilize the multimedia rules 200 to determine when the user-selected content 202 is displayed based on either: 1) a desired choreography or arrangement (e.g., images or photos are choreographed to be displayed based on the particular predefined content 204 to be displayed in a background segment) or 2) information about the content (e.g., a photo taken at a particular location will be shown while predetermined content 204 of scenes of the particular location are shown as a background segment).

In yet another embodiment, the scripting engine 32 can further utilize the multimedia rules 200 to determine how the user-selected content 202 is displayed by affecting any of the following: 1) how the user-selected content and predetermined content transitions within the scripted customized multimedia content (e.g., the particular motion path an image moves across the screen, such as sliding left to right or zooming in from center, etc.), 2) the graphical borders displayed around content (e.g., based on what predefined content is being shown in the background segment with the user-selected content), 3) how the user-selected content is to be rendered with the predefined content, 4) how the user-selected content is to be situated (i.e, overlaid or underlaid) with respect to the predetermined content, 5) the Chroma key "green screen" effect of the user-selected content 202, and 6) the order in which the segments of the customized multimedia content are assembled.

Figure 4B:
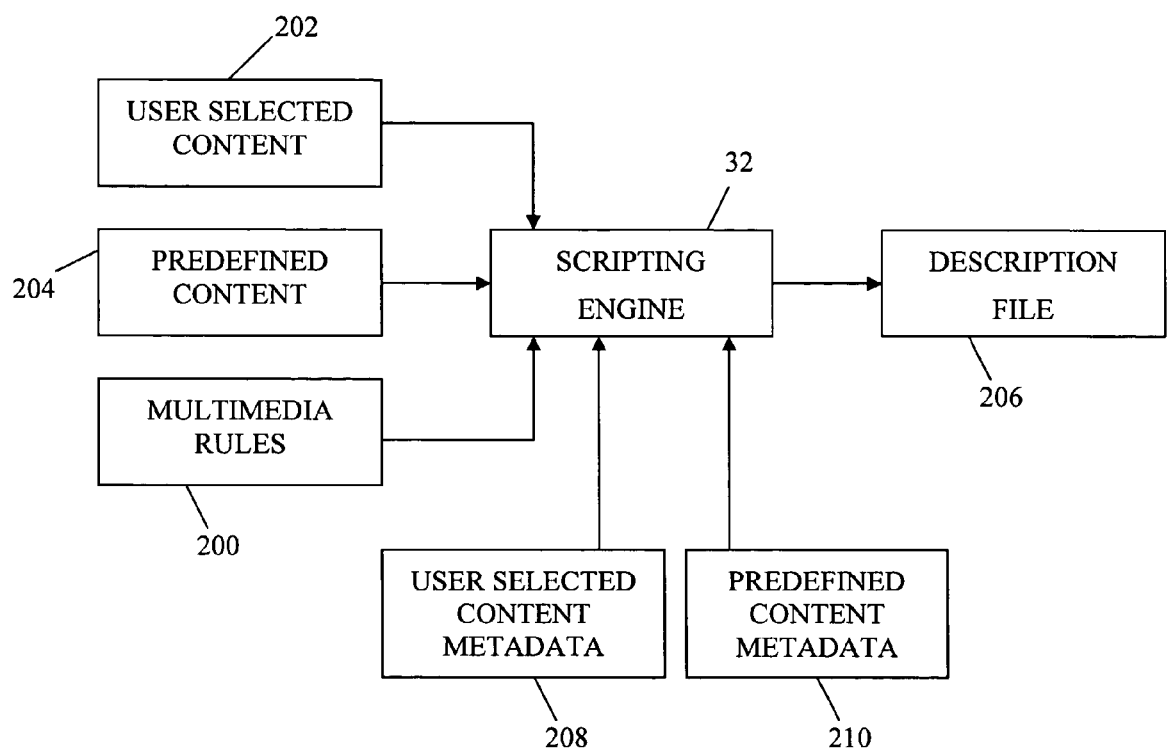
FIG. 4B illustrates a flow diagram for an embodiment in which a scripting engine generates a script for the customized multimedia content utilizing metadata.

FIG. 4B illustrates a flow diagram for an embodiment in which a scripting engine generates a script for the customized multimedia content utilizing metadata. In another embodiment, the scripting engine 32 utilizes the multimedia rule sets 200, the user-selected content 202, user selected content metadata 208, and predefined content metadata 210 as inputs to determine which predefined content 204 to include in the script. The user-selected content metadata 208 is parsed and compared with the predefined content metadata 210 as described above. If there is a match resulting from the comparison, a reference to the predefined content 202 is included in the script.

For example, if the scripting engine 32 determines, based on the multimedia rules 200, that a specific predefined content 204 should be included in the customized multimedia content, the scripting engine includes a reference to the specific predefined content 204 in the script. Likewise, if the scripting engine 32 received a request from a user to include user-selected content 202 in the customized multimedia content, the scripting engine 32 includes a reference to the user-selected content 202 in the script.

In another embodiment, the scripting engine 32 can utilize additional metadata to establish parameters in the customized multimedia content. Additional metadata can include a media identifier, a color identifier, a display time, and type of media.

FIG. 5 illustrates an exemplary DVD Description Language script generated in accordance to one embodiment. An XML file is illustrated where the references to the terms appearing in the DDL document can be further understood according to the following description of the DDL document. DVDs are generally composed of chapters, which correspond to the chapters that can be selected using the "next" and "previous" buttons. Chapters are subdivided into one or more segments. A segment is defined by a background audio/video clip. Each segment contains several still image overlays. Overlays correspond to a user's still image. The system 10 can enforce a minimum and maximum number of images per segment. The system 10 can select a shorter segment with similar content if there are a small number of images, and a longer segment if there are a large number of images. Additionally, in the embodiment of FIG. 5, there is a special chapter called a Menu, which is initially displayed when the CD is inserted, such that the DVD can possess the arrangement shown below.

```
DVD
   MENU
   CHAPTER
      SEGMENT
         Still Image Overlay
         Still Image Overlay
         Still Image Overlay
         Still Image Overlay
         Still Image Overlay
      SEGMENT
         Still Image Overlay
         Still Image Overlay
         Still Image Overlay
   CHAPTER
      SEGMENT
         Still Image Overlay
         Still Image Overlay
         Still Image Overlay
            CAPTION
            ART
         Still Image Overlay
         Still Image Overlay
   CHAPTER
      GALLERY
         Image
         Image
         Image
         Etc.
   Etc.
```

In one embodiment, each still image overlay can have attributes, which describe a decorative border, clip-art placement, and transition style. A special "Gallery" segment, shown above as the last segment, defines a chapter that contains only still images, displayed as large as possible within the video frame, each for a certain time period.

DDL Document Elements

The document is defined by enclosing <DDL> </DDL> tags. (DVD Description Language.).

TABLE 1

| <DDL> Attributes | | |
|---|---|---|
| Attribute | Value | Description |
| JOBID | Text | Opaque key to identify job |

The <MENU> tag, if present, must follow the <DDL> tag. It contains one or more <SELECTION> tags.

TABLE 2

| <MENU> Attributes | | |
|---|---|---|
| Attribute | Value | Description |
| TITLE | Text | Menu title, for example "Robert and David's Disney Vacation" |

TABLE 3

| <SELECTION> Attributes | | |
|---|---|---|
| Attribute | Value | Description |
| TITLE | Text | Menu Title |
| CHAPTER | Chapter ID | Forward reference to Chapter |

Following the </MENU> tag are one or more <CHAPTER> tags. These chapter tags correspond to accessible chapters on the DVD, which can be navigated using the previous and next chapter controls on the DVD player's remote control.

TABLE 4

| <CHAPTER> Attributes | | |
|---|---|---|
| Attribute | Value | Description |
| ID | Text | Chapter ID tag, referred to by Menu <SELECTION> element. |

Chapters contain one or more <SEGMENT> elements or a <GALLERY> element.

TABLE 5

| <SEGMENT> Attributes | | |
|---|---|---|
| Attribute | Value | Description |
| TRANSITION | TransitionID | Identifies a predefined transition, used when changing from previous segment (if any) into this one. |
| VIDEO | VideoID | Identifies a stock video clip, used as the background of this segment. There may be several variants of each video clip, with different lengths. The Video Renderer will automatically choose the segment with the most appropriate length that matches the VideoID. |

Segments serve as containers for Still Image Overlays, specified with the <IMAGE> tag. While not enforced at the DTD level, a minimum and maximum <IMAGE> tags per segment may be defined. The rendering engine 34 can select different length segments to provide a better fit for the number of contained images. Each image will appear for a certain time period depending on the number of images and the length of the segment, where images can be evenly or unevenly distributed over the segment.

Segments can contain multiple <IMAGE> tags:

TABLE 6

<IMAGE> Attributes

| Attribute | Value | Description |
|---|---|---|
| IMAGEID | ImageID | Global Unique ID that identifies the image. A request can be made to the Media Locator (and/or our fulfillment partner) to retrieve an image based on the Image ID |
| FRAME | AssetID | Selects a predefined FRAME that encloses the image. These frames will be available to the guest-facing GUI for preview, and be contained in the Stock Assets file system for reference by the Video Renderer. |
| Transition | TransitionID | Identifies a pre-defined transition, used to lead in/out this image. (For example: wipe, fade, checkerboard, etc.) |
| Time | hh:mm:ss.ff | Time from the start of the chapter for this segment, in HH:MM:SS.ff format (ff == frame). |
| Duration | SS.ff | Duration (in seconds/frames) that this image appears (including time for the transition in and out.) |

Images can optionally contain two more elements: <CAPTION> and <ART>. <CAPTION> defines text, font, and position for an image caption. <ART> defines an AssetID, and location for clip-art to be placed on the frame.

TABLE 7

<CAPTION> Attributes

| Attribute | Value | Description |
|---|---|---|
| TEXT | Text | Text of the caption. (Keep it short, it has to fit in a video frame.) |
| FONT | Text | Name of a predefined font. (Only certain fonts will be available.) |
| PosX | 0-719 | X position |
| PosY | 0-479 | Y Position (top is 0) |

TABLE 8

<CLIP> Attributes

| Attribute | Value | Description |
|---|---|---|
| ID | AssetID | Predefined ID of a clip-art asset |
| PosX | 0-719 | X position |
| PosY | 0-479 | Y Position (top is 0) |

In another embodiment, a chapter can contain a slideshow of still images, with no video background. Images are displayed as large as possible in the video, letterboxed or "pillarboxed" as appropriate if the images are not standard NTSC 4:3.

These slideshows are specified with a <GALLERY> tag inside a Chapter. Galleries contain <IMAGE> elements. Any Frame or Transition attributes are ignored.

TABLE 9

<GALLERY> Attributes

| Attribute | Value | Description |
|---|---|---|
| TIME | int | Number of seconds to display each image in the gallery |

Intelligent Rendering

Figure 6:
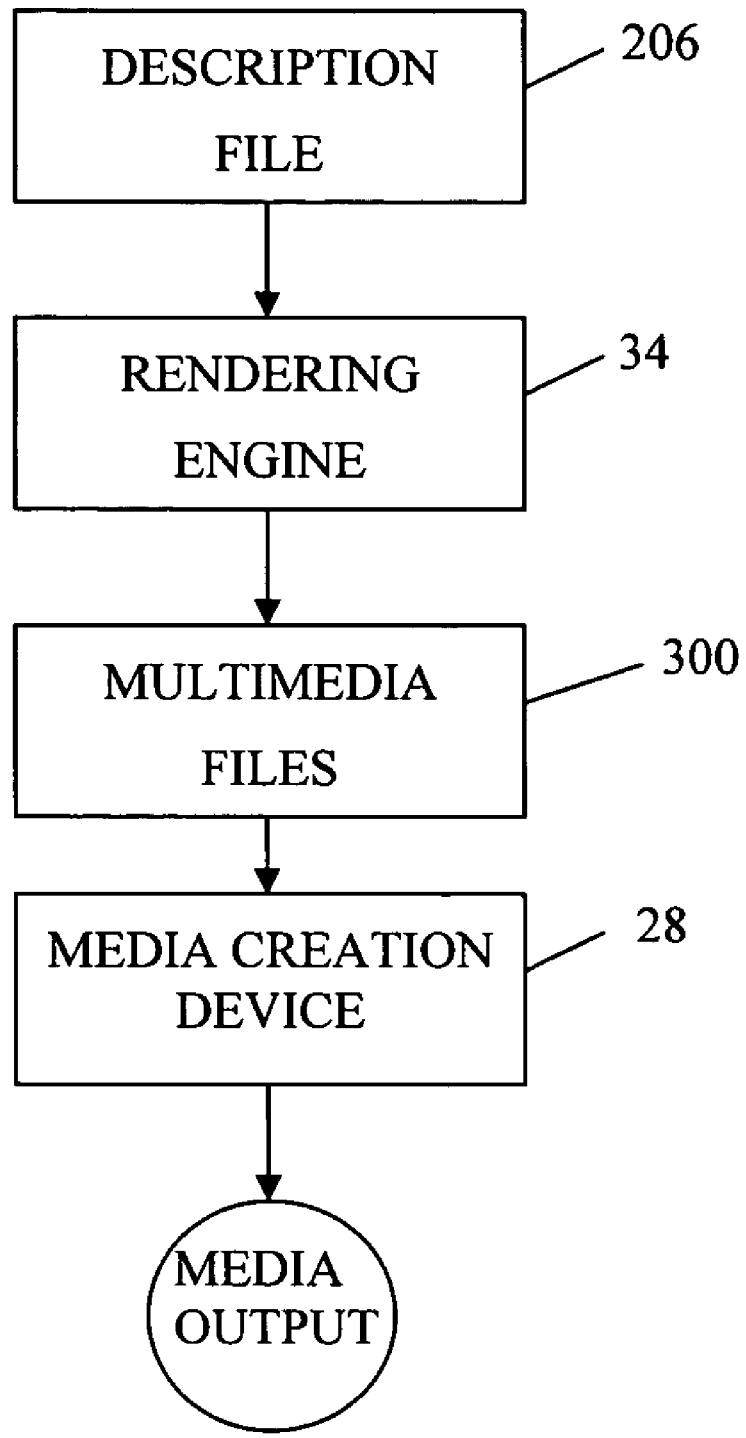
FIG. 6 illustrates a flow diagram of the rendering process for an embodiment.

Intelligent Rendering describes a method whereby a set of video files are created based on a script. As illustrated in FIG. 6, the rendering engine 34 is a collection of services or applications that run on the customized multimedia content creation system 10 that convert the command script (e.g., description file 206) into a set of multimedia files 300 representing the customized multimedia content. Optionally, the multimedia files 300 can then be recorded onto the desired readable medium, such as a DVD-R, by the media creation device 28 or can be shared with others by delivering the multimedia files 300 electronically to the others (e.g., via email). For example, in one embodiment, where the input devices 12 are located on a user's home computer and the user has accessed a website linked to a server containing the remaining components of the customized multimedia content creation system 10, the multimedia files 300 can be downloaded by the user or emailed to the user after they have been generated by the system 10.

Figure 7:
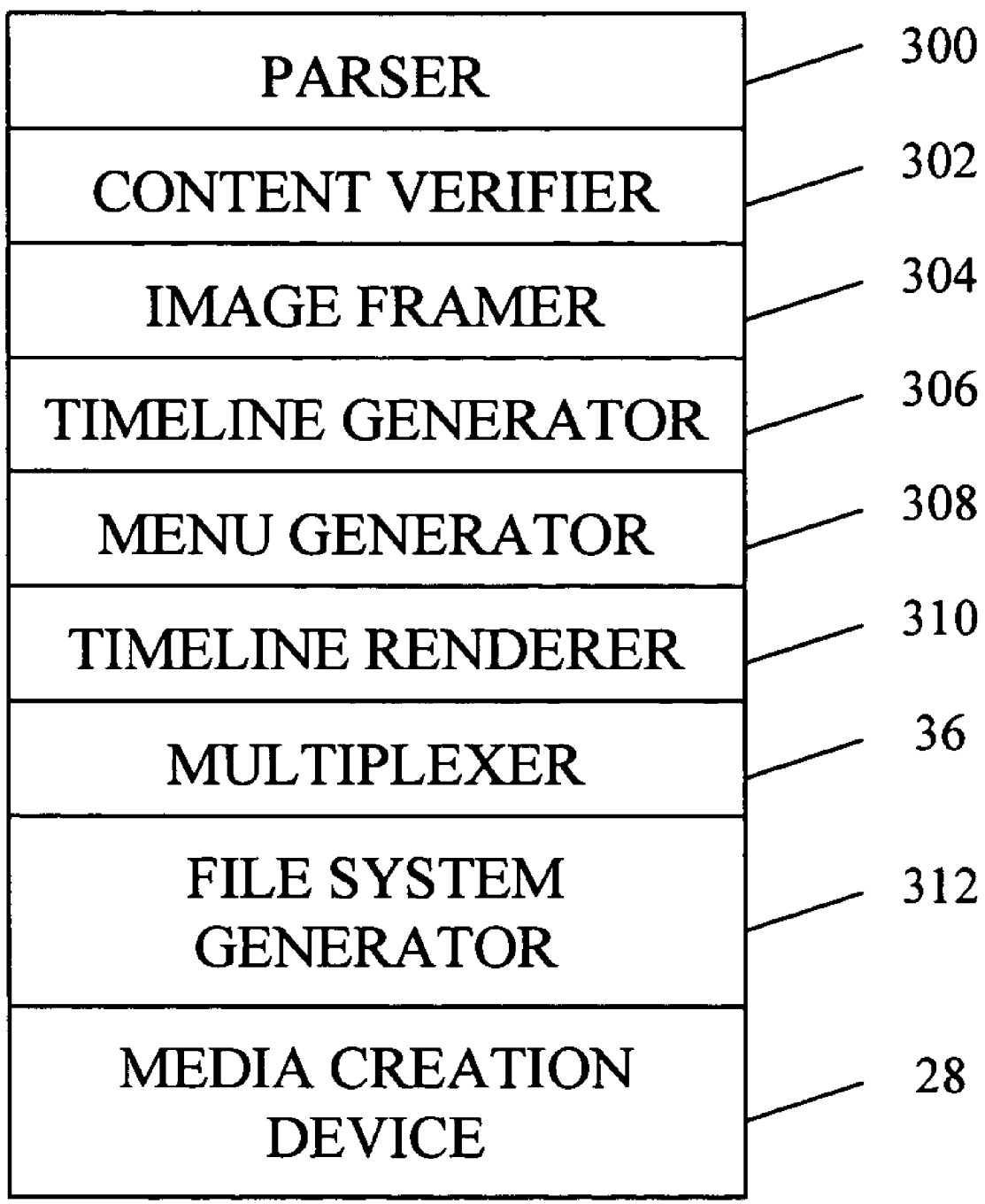
FIG. 7 is a block diagram illustration of an embodiment of the rendering engine of the system of FIG. 1.

FIG. 7 is a block diagram illustration of an embodiment of the rendering engine of the system of FIG. 1. A rendering engine 34, which may be implemented in software, hardware or a combination thereof. The rendering engine 34 includes a parser 300, image verifier 302, image framer 304, timeline generator 306, menu generator 308, timeline renderer 310, multiplexer 36, media file system generator 312 and media creation device 28. Certain of these components, such as multiplexer 36 and media creation device 28, may be included within the rendering engine application as illustrated in FIG. 7, or may be located separately from the rendering engine as illustrated in FIG. 1.

In one embodiment, the following process takes place to construct the final customized multimedia content output, where the exact ordering of the following steps can vary. Initially, the parser 300 parses the description file 206 or script produced from the inputs received from the user and verifies the script. The parser 300 will build data structures that reflect the structure of the final multimedia product, such as a DVD or other multimedia product. All multimedia content specified in the description file 206 is verified by the multimedia content verifier 302. For instance, all images or video clips to be included may be verified. For content supplied by the user, the rendering engine 34 will request that such content be provided from the memory 16 or a cache as specified in the description file 206 and load such user-supplied content. Predefined content will further be requested and loaded from the designated servers or storage devices containing such content (e.g., storage 18, image I/O 22, video I/O 24, audio I/O 26, etc.). In this manner, all content called for in the script (pre-defined and user-defined) is validated to be available to the rendering engine 34 and loaded. If any content is missing or unavailable, an error may be generated and reported.

In the case of a photo image, an image framer 304 in the rendering engine 34 would then select the correct frame for the aspect ratio, resize the image, apply a border (if applicable), perform other types of image modification, and generates a still image with alpha channel for inserting into the final video content. For example, the image may be scaled down to video size and stretched to be compatible with NTSC non-square pixels. The image framer 304 may also select a frame or border for an image that best fits the image (e.g., if the image is portrait, landscape, 3:2, 4:3, 16:9, etc.), where the frame is then blended around the image. During rendering, a filter can take the frame, image and transparency information and render it on top of another background, whether it is a still or moving background. During rendering, each image may be merged with a predefined background video, either as an overlay or a chroma key effect. While the image framer 304 is described with respect to images, it is understood that other types of media content, such as audio or video, can similarly be modified and altered utilizing other equivalent respective devices for performing such modifications to the other types of media content for blending such content into the final video.

The timeline generator 306 then converts the transitions, images and effects specified in the description file 206 into rendering instructions or API calls. All content transitions (e.g., bottomslide, fade in or out, centerswell) are implemented in a transitioner module in the timeline generator 306.

The rendering engine 34 includes a menu generator 308 for generating a menu for the particular video file being created. For example, when creating a DVD, DVD menus are a special MPEG-2 file having embedded bitmap graphics for the titles, highlights and graphics. The menu generator 308 would create the graphics and call a utility to embed the graphics into the video stream. The menu generator 308 may create a background graphics layer containing elements not used for making selections (e.g., titles), a selection layer containing buttons or icons in an "unselected" state, and a highlight layer containing buttons or icons in a "selected" state.

A timeline renderer 310 then processes the timeline generated by the timeline generator 306 to create video and audio files using MPEG encoder 20. The video tracks for each segment or chapter in the customized multimedia content are then combined together along with the audio tracks (MPEG-2 audio and PCM audio) by the multiplexer 36 into a single multimedia video stream compatible with the desired media format. For example, in the case of a DVD video file, the rendering instructions are processed to create a DVD-compatible MPEG-2 video file along with MPEG-2 audio and PCM audio tracks, where the MPEG-2 video, MPEG-2 audio and PCM audio are combined into a single MPEG-2 stream in a structure compatible with DVD players.

A file system generator 312 generates the final video file by combining the multiplexed audio and video tracks with the menu and structure information generated by the parser 300 to create a file system (i.e., set of files) containing the final customized multimedia content to be played on the desired devices. This set of files can be burned onto a DVD-R media and then played on standard commercially available players. If the media creation device 28 is located remotely from the rendering engine 34, the video files can be sent to the media creation device 28 via external connection 38 or another link along with commands to initiate the media creation process. This process can be utilized to create a DVD output, where these concepts can equally be applied to create any type of multimedia output.

By way of specific example, the method illustrated in FIG. 2 will be described in detail in one embodiment with reference to a user creating a personalized video product by selecting their own still images to be combined with other predefined or prerecorded media to provide a customized multimedia video. For instance, the video could be a personalized video summarizing a user's visit to an amusement park, cruise, special event, tourist attraction, or special event.

In one embodiment where the users are guests visiting an amusement park, the users will have the ability to customize their own personalized video via a variety of interactive graphical user interfaces (GUIs). These GUIs will allow users to select guest still images and predefined content to be included in their personalized videos. The GUIs will generate a script (e.g., in XML format when the final product will be a DVD) that describes the multimedia content to be included in the personalized video as well as instructions on how to assemble such content into a single video. After the guest visits the amusement park, the guest can become a user of the system and method of automatically creating customized multimedia content via the GUI. The script will then be electronically forwarded to a video renderer, which follows the instructions in the script to compile the user's individual photos and predefined content from the amusement park (e.g., audio, video or images of characters from the amusement park) into a single MPEG-2 format video stream. The video renderer then forwards the rendered MPEG-2 movie to a media creation device (e.g., DVD burner), which burns the video file onto a blank DVD for the user.

The video can be broken into multiple separate chapters determined by input provided by the user via the GUI. The length and number of chapters in each video will vary according to the number images or guest photos selected by the user, the content of those photos and other input from the user. For instance, chapters available for a guest of the Walt Disney World amusement parks could include "Magic Kingdom," "Epcot," "Disney-MGM Studios," "Disney's Animal Kingdom," or other chapters to incorporate photos taken outside the amusement parks. The predefined media for these types of selected chapters of the video could contain the themes and content, such as footage of the amusement park including parks and non-park content, the guest's resort or hotel, and sports and/or recreation events.

The video product in this example could also contain a photo gallery or slide show of guest images set to background music. Photos would be displayed for a predetermined duration when shown in slide show mode. To enable background music and to ensure usability with the widest possible number of DVD players, the photo gallery slide show may play as a single movie file. The photo gallery could include all of the user's photos appearing in the video and may further include additional predefined photos selected by the user via the GUI.

User-selected images may come from a variety of sources including guest-owned digital or wet film cameras, camera phones, single use cameras or digital images updated from an external source. Images included in the predefined content may include photographs taken at the amusement park by professional photographers or on selected attractions equipped with automated photography devices, where such images can include metadata flags that indicate specific characteristics of the photograph, such as the date/time when an image was taken, the location where the picture was taken, the content of the image (e.g., people or characters appearing in the image, or the resolution and size of the image. The data in these flags can be utilized by the system 10 in creating the script to position images in appropriate locations within the video content. For example, if a photo were tagged with a location of "Epcot" and character "Mickey Mouse," the system 10 would incorporate that photo into background video footage featuring Epcot footage and would assign a character transition other than Mickey to prevent two of the same character from being on-screen at the same time.

The video may include transition video segments that are brief video clips leading into and out of the video chapters and do not include any guest photos. Transition video segments may include an introductory video clip that plays automatically after the video DVD is loaded and ends on the main menu screen of the DVD, copyright and other legal information, transition clips that lead into and out of each chapter that permit chapters and photo segments to be seamlessly blended together in any order, and/or a brief transition clip from the main DVD menu into the photo gallery.

In another embodiment, still image overlays can be included. The still image overlays can be graphic media elements and instructions that accompany each photo in the video. Still image overlays may include a decorative border that frames all four sides of the photo that exists in a layer below the photo but above the background video segment, an optional clip art overlay that is layered on top of the photo, a transition style to bring the photo onto and off of the screen and may include standard video transition effects (e.g., fade, wipe, etc.) or choreographed two-dimensional movements (e.g., zoom, rotate, reposition on the screen) of the photo, audio effects to accompany the transition of the photo onto and off of the screen.

Video effect overlays may also be provided in this exemplary embodiment which are video effects that appear in the foreground over a user-selected still image and the background video. The video effect overlays may appear in front of or behind still image overlays depending on the desired creative effect (e.g., characters appearing within a picture frame as a transition between two guest photos).

While the above-described exemplary embodiment was directed to a video keepsake of a guest's visit to an amusement park, this example is not intended to limit the scope of the disclosure in any manner. It should be appreciated by those skilled in the that the present system and method of automatically creating customized multimedia content can utilize any type of content selected by a user and combine such user-selected content with any type of predefined content that is not explicitly selected by the user to automatically generate a final customized multimedia product.

While the above description contains many specific embodiments, these should not be construed as limitations on the scope of the disclosure, but rather as an exemplification of preferred embodiments thereof. The separate aspects of each embodiment described herein may be combined with the other embodiments described herein. Those skilled in the art will appreciate that various adaptations and modifications of the just described embodiments can be configured. Therefore, it is to be understood that, within the scope of the appended claims, different embodiments may be practiced other than as specifically described herein.

We claim:

1. A method comprising:
   providing selectable media content for selection by a user, the selectable media comprising media received from the user;
   generating a first set of metadata for at least a portion of predefined media content, the predefined media content comprising previously prepared media content not selectable by the user;
   receiving from the user one or more selections of selectable media content for inclusion in customized media content;
   generating a second set of metadata for user-selected media content in response to the one or more selections;
   automatically selecting at least the portion of the predefined media content for inclusion in customized media content if a threshold for similarity has been surpassed as a result of comparing the first set of metadata with the second set of metadata according to a set of rules;
   creating a script for the customized media content, the script including a reference to the user-selected media content and a reference to at least the portion of the predefined media content not selected by the user; and
   generating the customized media content by parsing and verifying the script;
   wherein the customized media content comprises the user-selected media content and at least a portion of the predefined media content not selected by the user arranged according to the script.

2. The method of claim 1, wherein the first set of metadata describes a characteristic of the predefined media content.

3. The method of claim 1, wherein the second set of metadata describes a characteristic of the user-selected media content.

4. The method of claim 1, wherein the threshold for similarity requires an exact match between the first set of metadata and the second set of metadata.

5. The method of claim 1, wherein the threshold for similarity requires a match between the first set of metadata and at least a portion of the second set of metadata.

6. The method of claim 1, wherein the threshold for similarity requires a match between at least a portion of the first set of metadata and at least a portion of the second set of metadata.

7. The method of claim 1, wherein the script further includes additional metadata for the customized media content.

8. The method of claim 7, wherein the additional metadata is a media identifier.

9. The method of claim 7, wherein the additional metadata includes a color identifier.

10. The method of claim 7, wherein the additional metadata includes a display time.

11. The method according to claim 7, wherein the additional metadata includes a type of media.

12. The method of claim 1, further comprising receiving input from the user comprising a selection of a theme.

13. The method of claim 1, further comprising receiving input from the user comprising a title for the customized media content.

14. The method of claim 1, further comprising receiving input from the user comprising an order of user-selected media content.

15. The method according to claim 1, wherein creating a script for the customized multimedia content further comprises:
   intelligently scripting a set of instructions for creating the customized multimedia content using a set of rules affected by the user-selected content; wherein the set of rules are further related to the predefined content.

16. A method comprising:
   providing selectable media content for selection by a user, the selectable media content comprising media received from the user;
   providing predefined media content, the predefined media content comprising previously prepared media content not selectable by the user;
   receiving one or more selections of selectable media content from the user for inclusion as user-selected media content in customized media content;
   selecting a portion of the predefined media content based upon the user-selected media content;

automatically creating a script for the customized multimedia content based upon a set of rules associated with the user-selected media content and the predefined media content; and generating the customized multimedia content by parsing and verifying the created script;

wherein the customized media content comprises the user-selected media content and at least a portion of the predefined media content not selected by the user arranged according to the script.

17. The method of claim 16, wherein the script is created without further interaction from the user after receiving the one or more selections.

18. The method of claim 16, wherein a set of rules determines a relationship between the user-selected media content and the predefined media content not selected by the user in the customized multimedia content.

19. The method of claim 18, wherein generating the customized multimedia content comprises:

validating all user-selected media content and predefined media content not selected by the user identified in the script;

converting the script into rendering instructions; and processing the rendering instructions to create the customized multimedia.

20. The method of claim 16, wherein the user-selected media content contains metadata.

21. The method of claim 20, further comprising selecting the predefined media content not selected by the user based upon the metadata contained in the user-selected media content.

22. The method of claim 16, further comprising generating a multimedia disc using the customized multimedia content.

23. The method of claim 16, wherein said predefined media content not selected by the user includes at least one of images, video, audio, text and graphics that are theme specific and related to a theme represented in said one or more selections of selectable media content from the user.

24. The method of claim 23, wherein said customized multimedia content includes a combination of at least two images, video, audio, text and graphics.

25. The method of claim 16, wherein the script is created into a description file.

26. The method of claim 25, wherein the description file is rendered into a video file when creating the customized multimedia content.

27. The method of claim 16, wherein the user-selected media content comprises images and the predefined media content not selected by the user comprises at least one of video, audio, text, graphics and images.

28. The method according to claim 16, wherein automatically creating a script for the customized multimedia content based upon a set of rules associated with the user-selected media content and the predefined media content further comprises:

intelligently scripting a set of instructions for creating the customized multimedia content using a set of rules affected by the user-selected content; wherein the set of rules are further related to the predefined content.

29. A system of automatically creating customized multimedia content, the system comprising:

an input device that receives user-selected media content, and receives predefined media content to be included in the customized multi-media content, wherein the predefined media content to be included in the customized multi-media content is selected by the system from stored predefined media content not selected by the user and wherein the stored predefined media content is selected by the system based on the user selected media content;

a scripting engine that automatically creates a script for the customized multimedia content based upon a set of rules associated with the user-selected media content; and a rendering engine that parses and verifies the script to generate the customized multimedia content.

30. The system of claim 29, wherein the scripting engine creates the script without further interaction from the user after the user selects the user-selected media content.

31. The system of claim 29, wherein a set of rules determines a relationship between the user-selected media content and the predefined media content to be included in the customized multimedia content.

32. The system of claim 31, wherein the rendering engine further:

validates all user-selected media content and the predefined media content to be included in the customized multimedia content identified in the script;

converts the script into rendering instructions; and processes the rendering instructions to create the customized multimedia content.

33. The system of claim 29, wherein the user-selected media content contains metadata.

34. The system of claim 33, wherein the stored predefined media content is selected based upon the metadata contained in the user-selected media content.

35. The system of claim 34, wherein said predefined media content to be included in the customized multimedia content includes at least one of images, video, audio, text and graphics.

36. The system of claim 35, wherein said customized multimedia content includes a combination of at least two of images, video, audio, text and graphics.

37. The system of claim 29, further comprising a multimedia creation device that generates a multimedia disc using the customized multimedia content.

38. The system of claim 29, wherein the user-selected media content includes at least one of images, video, audio, text and graphics.

39. The system of claim 29, wherein the scripting engine creates the script as a description file.

40. The system of claim 39, wherein the rendering engine renders the description file into a video file when creating the customized multimedia content.

41. The system according to claim 29, wherein the scripting engine that automatically creates a script for the customized multimedia content based upon a set of rules associated with the user-selected media content is further configured to:

intelligently script a set of instructions for creating the customized multimedia content using a set of rules affected by the user-selected content; wherein the set of rules are further related to the predefined content.

42. A computer-readable medium having instructions stored therein for automatically creating customized multimedia content, the instructions comprising:

receiving user-selected media content to be included in the customized multimedia content;

selecting predefined media content not selected by the user to be included in the customized multimedia content;

automatically creating a script for the customized multimedia content based upon a set of rules associated with the user-selected media content and the predefined media content selected by the user; and generating the customized multimedia content by parsing and verifying the created script;

wherein the predefined media content not selected by the user includes one or more of images, video, and audio.

43. The computer-readable medium of claim 42, wherein the set of rules determines a relationship between the user-selected media content and the predefined media content not selected by the user in the customized multimedia content.

44. The computer-readable medium of claim 43, wherein generating the customized multimedia content comprises:
- validating all user-selected media content and predefined media content not selected by the user identified in the script;
- converting the script into rendering instructions; and
- processing the rendering instructions to create the customized multimedia content.

45. The computer-readable medium of claim 42, wherein the user-selected media content contains metadata.

46. The computer-readable medium of claim 45, wherein the selecting predefined media content not selected by the user is based upon the metadata contained in the user-selected media content.

47. A computer-readable medium according to claim 42, wherein automatically creating a script for the customized multimedia content based upon a set of rules associated with the user-selected media content and the predefined media content selected by the user further comprises:
- intelligently scripting a set of instructions for creating the customized multimedia content using a set of rules affected by the user-selected content; wherein the set of rules are further related to the predefined content.

* * * * *